United States Patent Office 3,018,171
Patented Jan. 23, 1962

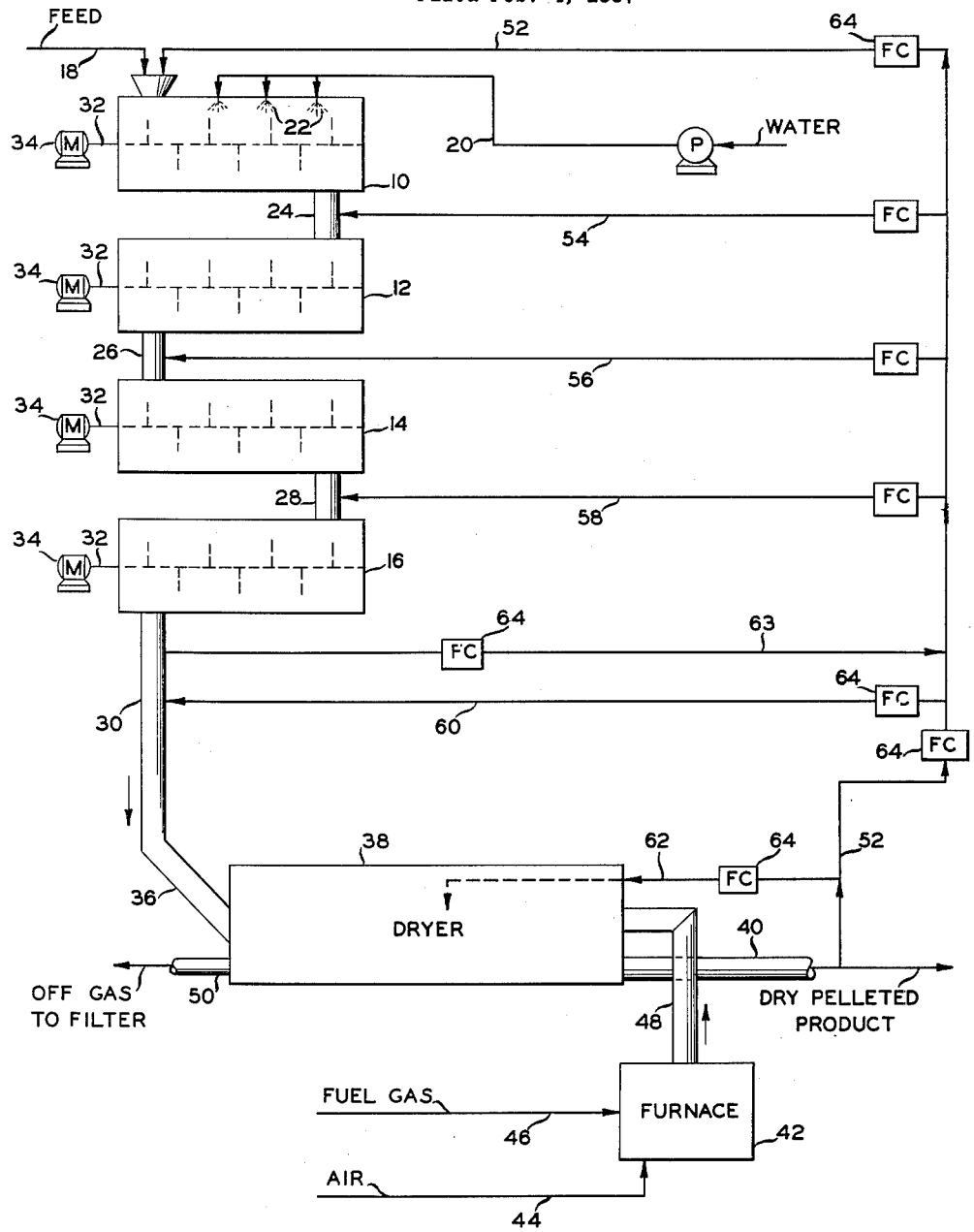

3,018,171
WET PELLETING PROCESS AND APPARATUS
Lyle W. Pollock and James Q. Wood, Bartlesville, Okla., assignors to Phillips Petroleum Company, a corporation of Delaware
Filed Feb. 4, 1957, Ser. No. 637,907
11 Claims. (Cl. 23—314)

This invention relates to a process and apparatus for the wet pelleting of powdered materials such as carbon black.

It is conventional to pellet various types of carbon blacks in order to facilitate handling without excessive loss of the black to the atmosphere and to reduce the bulk of the black. One pelleting method comprises tumbling the loose flocculent black in a horizontally elongated cylindrical mill by rotation of the mill so that the black emerges from the delivery end of the mill in the form of small pellets. In another type of process, the black is fed to a pug mill and there admixed with water so that the agitation of the black provided by the mill forms the black into pellets. Usually several of these mills are connected in series so that the carbon black is converted into small pellets by the time it passes thru the several mills and emerges from the last mill of the series. The pellets are then fed to a dryer which removes the water and leaves the carbon black in the form of small dry pellets with a minor amount of carbon black dust in the pellet stream.

We have devised a wet pelleting process and apparatus which produces pellets of increased size, density, and strength and decreases the dust content of the product stream. It also improves the drying rate and effects smaller variations in the temperature of the pellets in the dryer than is conventional. This reduction in temperature fluctuation in the dryer produces improved quality black which improves the quality of compounded rubber in which the carbon black is incorporated.

Accordingly, it is an object of the invention to provide an improved process and apparatus for wet pelleting of powdered materials such as carbon black. Another object is to provide a pelleting process which increases the size, density, and/or strength of the resulting pellets compared with conventional pellets. A further object is to provide a process and apparatus for pelleting which effects smaller variation in the temperature of the pellets and, hence, better quality of black in compounded rubber in which the black is incorporated. It is, also, an object of the invention to provide a process and apparatus for wet pelleting of carbon black which effects more rapid drying. Other objects will become apparent from a consideration of the accompanying disclosure.

The process of the invention comprises pelleting powdered pelletable material in one or more pelleting mills in admixture with water so that the powdered material is in the form of wet pellets as it emerges from the mill, passing the wet pellets to a dryer, maintaining a hot drying ambient in the dryer whereby substantially dry pellets emerge from the dryer, and recycling pellets from a selected point or location in the pellet stream to an upstream point or location in the process. In one embodiment of the invention dry pellets from the effluent of the dryer are recycled to the dryer and/or to one or more of the pelleting mills. In another embodiment of the invention wet pellets are recycled from a point intermediate the last pelleting mill and the dryer to one or more of the pelleting mills. It is also feasible to recycle both wet and dry pellets to upstream points in the process.

A more complete understanding of the invention may be had by reference to the accompanying schematic drawing which is a flow sheet illustrating the various embodiments of the invention.

Referring to the drawing, a series of pug mills 10, 12, 14, and 16, are connected in series so that feed introduced to mill 10 via line 18 admixed with water introduced via line 20 and sprays 22 pass through the series of mills including conduits 24, 26, and 28, and emerges in the form of pellets in conduit 30. Each of the pug mills is provided with a conventional axial agitator or beater assembly 32 with which is connected a motor 34 for driving the same. Pug mills of this nature are conventional and are described in greater detail in numerous patents including U.S. Patent 2,550,802 and further description is considered unnecessary.

Conduit 30, which may include a conveyor, connects with inlet conduit 36 of dryer 38. Dryer 38 may comprise a rotatable elongated cylinder thru which the wet pellets pass slowly during rotation and emerge thru conduit 40, containing less than about 1% by weight of moisture. A drying ambient in dryer 38 is provided by means of furnace 42 which is fed air thru line 44 and a suitable fuel gas thru line 46 so that hot effluent combustion gas passes thru line 48 to the delivery end of the dryer. Off-gas from the dryer containing a minor amount of suspended dust is passed via line 50 to a filter not shown for recovery of dust. Clean off-gas may be recycled if desired.

A system of recycle lines is provided for recycling pellets in accordance with the invention. The lines shown comprise conveyors suitable for transferring pelleted material from one point to another in the system without excessive breakage of the pellets. A recycle line 52 connects effluent pellet line 40 with the inlet of mill 10. Auxiliary recycle lines 54, 56, and 58 connect recycle line 52 with the inlets of mills 12, 14, and 16 respectively. Line 60 connects recycle line 52 with effluent conduit 30 from mill 16 for recycle of dry pellets to the feed end of dryer 38. Recycle line 62 connects recycle line 52 with an intermediate section of dryer 38. Line 63 connects conduit 30 with recycle line 52 for recycling wet pellets. One or more flow-control devices 64 is provided in each of the recycle lines in order to facilitate control of the operation of the apparatus in accordance with the invention. These flow controllers may comprise valves, motors which operate the conveyors at any desired speed, or any other means of controlling the flow rate of pellets in the various lines.

In operations utilizing carbon black in dry, flocculent form as the feed in line 18, this material is introduced continuously to pug mill 10 along with water from line 20 so that the resulting mixture pellets readily as it passes thru the series of mills. In order to provide suitable pellets in a wet pelleting process of this type the amount of water introduced should be in the range of about 35 to 65 weight percent resulting mixture. Pelleting is initiated in mill 10 and the effluent material passes thru conduit 24 into mill 12 where the pelleting is continued and then thru conduit 26, mill 14, conduit 28, and mill 16, so that the resulting material in pelleted form progresses thru conduit 30 and is passed to inlet conduit 36 of dryer 38 in which the hot flue gas passing over and thru the wet pellets reduces the moisture content to about 1% or less by weight.

Dry pellets are recycled from line 40 thru line 52 to various points upstream, including any one of the pug mills as well as the upstream end of dryer 38 or an intermediate section thereof. Wet pellets are recycled via line 63 to line 52 from which they are passed to any one or all of the pug mills via lines 52, 54, 56, and/or 58. It is feasible to recycle both wet and dry pellets to the pug mills with or without recycle of dry pellets to the dryer. The amount of recycle of either wet or dry pellets or the combination of both should be in the range of $1/10$ to 5 times the amount of pellets taken off as product on a volume basis.

Recycling of either wet or dry pellets to the pug mills has the effect of increasing the size, density, and strength of the pellets. It also decreases the dust in the product pellets because of their increased strength and density. A faster drying rate results from coating dry pellets with a layer of wet carbon black because of the reduction in the depth of material thru which the moisture must diffuse in the drying step. Recycling dry pellets to the dryer improves temperature control in the dryer so that the product pellets are subjected to smaller temperature variation and lower maximum temperature therein. In conventional pellet drying the temperature of the pelleted product at times varies up to 200° F. from the desired temperature. If the temperature of the product becomes excessive, the modulus and other properties of other rubber-black compounds are adversely affected. The black temperature increases very rapidly after it becomes dry. If the quantity of black throughput in the dryer is increased, additional black increases the heat capacity of the carbon black passing thru the dryer and therefore any change in heat input results in a smaller variation in pelleted product temperature. With recycle the increased quantity of black put thru the dryer has the effect of "soaking up" changes in heat input which are unavoidable.

Certain modifications of the invention will become apparent to those skilled in the art and the illustrative details disclosed are not to be construed as imposing unnecessary limitations on the invention.

We claim:

1. A process for pelleting powdered pelletable material which comprises passing said material in dry condition into the first of a series of wet pelletizers; mixing water with said material in said pelletizers; agitating the resulting wet mixture while passing same thru said pelletizers in series to form wet pellets; passing at least the major portion of said wet pellets to a dryer and contacting the same therein with a hot drying gas so as to produce dry pellets; withdrawing a substantial proportion of the pellets from the process at a point downstream of the last pelletizer; and recycling withdrawn pellets substantially in the form and condition withdrawn to a point at least one process step upstream of the withdrawal point.

2. A process for pelleting carbon black which comprises passing dry flocculent carbon black into the first of a series of wet pelletizers; admixing water with the black in said pelletizers; agitating the resulting wet mixture while passing same thru said pelletizers in series so as to form wet pellets; passing at least the major portion of said wet pellets to a dryer and contacting same therein with a drying gas so as to produce dry pellets; removing a substantial proportion of the pellets from the process at a point downstream of the pelletizers; and recycling withdrawn pellets substantially in the form and condition withdrawn to an upstream point in the process at least one process step above the withdrawal point.

3. The process of claim 2 wherein dry pellets are recycled from the effluent stream from the dryer to an upstream point in the process.

4. The process of claim 3 wherein wet pellets are recycled from a point intermediate the pelletizer and dryer to the pelleting step.

5. The process of claim 3 wherein the dry pellets are recycled to the wet pelletizer.

6. The process of claim 3 wherein the dry pellets are recycled to the dryer.

7. The process of claim 2 wherein the wet pelletizer comprises a plurality of pug mills connected in series.

8. The process of claim 2 wherein the ratio of recycle to product pellets is in the range of 1:10 to 5:1 by volume and the amount of water admixed with the black in said pelletizers is in the range of 35 to 65 weight percent of the mixture.

9. The process of claim 7 wherein dry pellets are recycled to one of said pug mills and also to said dryer.

10. Apparatus for wet pelleting of powdered solids such as carbon black comprising in combination a plurality of pug mills connected in series by conduits for passing solids from any mill, except the last, to the next mill in the series; means for spraying water into the first mill; a pellet effluent line leading from said last mill; a dryer connected by conduit means with said pellet effluent line; a feed inlet for introducing powdered solids to the first mill in said series; means for maintaining a hot drying ambient in said dryer; a dry pellet effluent line leading from an outlet in said dryer; a first recycle line for dry pellets connected with the downstream end of said dryer and with one of said pug mills; a second recycle line for dry pellets leading to the upstream end of said dryer; and recycle control means in said recycle lines.

11. The apparatus of claim 10 wherein said first recycle line leads to said first mill and including a recycle line to at least one other mill in said series.

References Cited in the file of this patent
UNITED STATES PATENTS

| | | |
|---|---|---|
| 2,131,686 | Heller et al. | Sept. 27, 1938 |
| 2,304,382 | Shoeld | Dec. 8, 1942 |
| 2,306,698 | Heller | Dec. 29, 1942 |
| 2,327,016 | Carney | Aug. 17, 1943 |
| 2,438,450 | Nelson | Mar. 23, 1948 |
| 2,457,962 | Whaley | Jan. 4, 1949 |
| 2,478,757 | Foster | Aug. 9, 1949 |
| 2,550,802 | Gholson | May 1, 1951 |
| 2,638,625 | Studebaker et al. | May 19, 1953 |
| 2,798,801 | Kiefer et al. | July 9, 1957 |
| 2,835,562 | Boyer et al. | May 20, 1958 |
| 2,844,445 | Webster et al. | July 22, 1958 |
| 2,890,942 | Webster et al. | June 16, 1959 |

FOREIGN PATENTS

| | | |
|---|---|---|
| 688,776 | Great Britain | Mar. 11, 1953 |